United States Patent [19]

Austin

[11] Patent Number: 5,472,031

[45] Date of Patent: Dec. 5, 1995

[54] APPARATUS FOR FLATPROOFING TIRES

[76] Inventor: M. Robert Austin, 9344 Royal Mountain Dr., P.O. Box 23891, Chattanooga, Tenn. 37421

[21] Appl. No.: 189,878

[22] Filed: Feb. 1, 1994

[51] Int. Cl.$^6$ .......................... B29C 73/16; B29D 30/04
[52] U.S. Cl. .............................. 152/415; 141/38; 81/15.6; 137/223
[58] Field of Search ................... 152/415; 222/4; 141/38, 5; 81/15.6; 156/95, 97; 137/223

[56] References Cited

U.S. PATENT DOCUMENTS

| | | | |
|---|---|---|---|
| 507,380 | 10/1893 | Neilson | 152/415 |
| 589,878 | 9/1897 | Veith | 152/415 |
| 604,424 | 5/1898 | Schrader | 152/415 |
| 688,199 | 12/1901 | Schrader | 152/415 |
| 4,185,670 | 1/1980 | Sartell, Jr. | 152/415 X |
| 4,807,658 | 2/1989 | Patti | 152/415 X |
| 5,070,917 | 12/1991 | Ferris et al. | 141/38 |
| 5,121,780 | 6/1992 | Goodman | 152/415 |
| 5,305,784 | 4/1994 | Carter | 137/231 |

*Primary Examiner*—Michael W. Ball
*Assistant Examiner*—Francis J. Lorin
*Attorney, Agent, or Firm*—Dickinson, Wright, Moon, Van Dusen & Freeman

[57] ABSTRACT

Flatproofing liquid is provided to tires through a one-way disposable valve assembly. In accordance with the method, the valve stem core is removed from the tire to allow the liquid to be freely admitted. A one-way valve is attached to the valve stem, and the tire is filled with the flatproofing material. The flatproofing material is then allowed to cure in the tire and in the valve. After curing, the valve is removed and discarded. The apparatus includes an inexpensive one-way valve for connection to the valve stem at one end and supply hoses at the other.

2 Claims, 1 Drawing Sheet

5,472,031

APPARATUS FOR FLATPROOFING TIRES

FIELD OF THE INVENTION

This invention relates to the art of method and apparatus for flatproofing tires.

BACKGROUND OF THE INVENTION

Tires on industrial equipment are constantly exposed to sharp objects, including metal, glass, thorns, and rocks, making them the most vulnerable part of such equipment. Consequently, flat tires are a common cause for equipment down time.

In response to these problems, a number of methods have been developed to flatproof tires. One such method replaces the air in a tire with polyurethane, neoprene, or other suitable polymeric materials. The polymeric materials may either be dry filled into the tire as solid particles, or may be liquid filled into the tire as a mixture of reactants which cures over time into a solid polymeric mass.

In the liquid fill method, the valve stem core is removed from the valve stem of the tire, and the tire is deflated to atmospheric pressure. A device for pressure filling the tire is then attached to the valve stem for filling the tire with liquid reactants. As the tire fills with the liquid, air in the tire rises to the top of the tire and is allowed to escape through a suitable perforation in the tire casing. When the tire is completely filled with liquid, as indicated by the emission of liquid from the perforation, the flow of liquid into the tire is stopped and the perforation blocked. Then, additional liquid is added until a desired pressure is achieved.

Because the valve stem core has been removed from the valve stem to allow introduction of the liquid reactants, it is necessary upon completion of filling to block the valve stem while the polymeric mixture in the tire is curing. Presently, this is accomplished by replacing the valve stem core after the tire has been filled. The tool commonly used for this purpose has a barrel that fits over the valve stem at one end. The other end of the barrel is connected to hoses that supply the liquid reactants to the tire. A syringe-like device extends through the center of the barrel and has a plunger upon which the replacement valve stem core is mounted. In use, the plunger is carefully manipulated inward until the replacement valve stem core is aligned with the threaded surface on the interior of the valve stem. The plunger is then twisted to screw the valve stem core into place in the valve stem.

This prior method, thus requires one to follow for each tire the steps of (1) removing the valve stem core, (2) attaching the barrel, (3) filling the tire, (4) replacing the valve stem core while the liquid polymer pressure is maintained, and (5) detaching the barrel. After this is accomplished for one tire, the worker moves to the next tire and repeats the same steps. With regard to step (4), it should be remembered that the valve stem is very small, and properly aligning the replacement valve stem core with the threaded surface in the valve stem is cumbersome and time consuming in practice, thus contributing to the high cost of flatproofing.

SUMMARY OF THE INVENTION

In accordance with the present invention, tires are filled with the aid of a disposable one-way valve. The operation of a one-way valve per se is known in the art, but the particular housing for the valve used in accordance with the invention is adapted to be attached to a valve stem at one end and to supply hoses at the other.

Prior to using the device of the present invention to fill a tire, air is released from the tire by removing the valve stem core of the tire. Thus, the interior of the tire is allowed to reach atmospheric pressure. Next, the one-way valve housing of the invention is connected to the valve stem by means of a threaded hole that matches the size of the valve stem. Then the other end of the valve housing is attached to a hose assembly connected to a supply of liquid fill reagents.

The liquid fill reagents are passed through the tube assembly, through the valve housing, and into the tire. As the tire fills with the liquid reactants, air remaining in the tire rises to the top of the tire, where it is allowed to escape through a suitable perforation made in the tire casing. When the tire is completely filled, as indicated by the emission of liquid from the perforation, the flow of liquid into the tire is stopped. The perforation is then blocked, as by a screw, and additional liquid is added until the desired pressure is attained.

After the flow of liquid through the delivery tube has been stopped, the outward pressure of fluid within the tire causes the one-way valve to close to prevent flow of fluid back into the supply hoses. The supply hose is then detached from the valve housing, and the polymer in the tire, the valve stem, and the valve housing is allowed to cure into a hardened polymeric mass. While the polymer cures, the worker applies another one-way valve housing to a subsequent tire and repeats the above process. After curing is substantially complete, the valve housings are disengaged from the tires and discarded.

Thus, according to the invention, tires are filled with flatproofing material by (1) removing the valve stem core, (2) attaching the one-way valve assembly, (3) filling the tire, and (4) discarding the valve after cure.

It is thus an object of the present invention to provide an easy, economical method of flatproofing a tire.

It is a further object of this invention to provide a device that will effect the flatproofing of a tire in an easy, economical fashion.

It is a further object of the present invention to provide an economical, easy to use, pressure resistant means for stopping the valve stem of a tire after flatproofing the tire with liquid reactants.

DETAILED DESCRIPTION OF THE INVENTION

Figure 1:
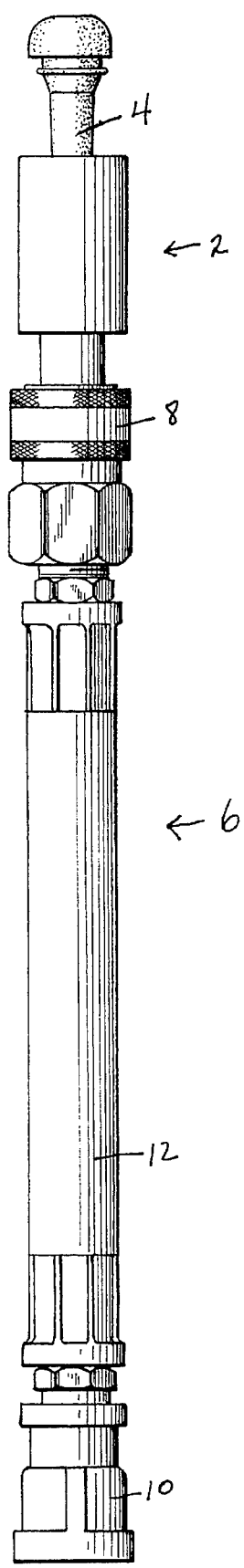
FIG. 1 is a side view of a valve in accordance with the present invention attached to a hose assembly.

With reference FIG. 1 of the drawings, a device in accordance with the invention comprises a valve 2 attached to a known valve stem 4 at one end and to a hose assembly 6 at the other end. The hose assembly carries the liquid reagents used in the liquid fill method to a tire (not shown) having the valve stem 4, which is to be filled. The hose assembly 6 is equipped at one end with a female quick disconnect connector 8, which is capable of being easily attached to or detached from the valve 2. The other end of the hose assembly includes a threaded pipe connector for interfacing with a source of the liquid reactants for filling the tire. The pipe connector is threaded may have an inner diameter of about ⅞". The hose 12 of the hose assembly 6 is preferably made of flexible, pressure resistant material, such as reinforced rubber. The interior of the hose may be coated with Teflon or similar materials which are resistant to the chemicals used in flatproofing tires.

Figure 2:
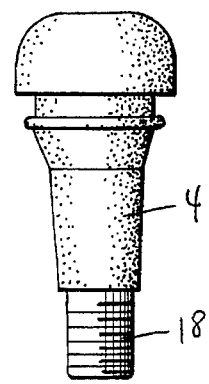
FIG. 2 is an exploded view of a valve of the present invention.
Figure 2:
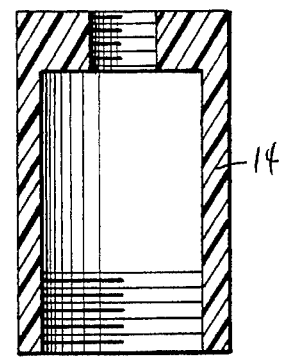
Figure 2:
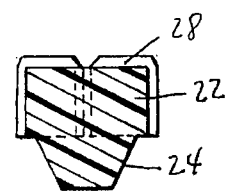
Figure 2:
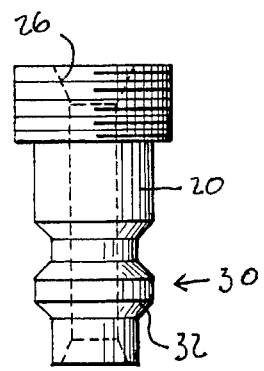

FIG. 2 illustrates the components of the valve assembly of the present invention. The valve assembly comprises a housing 14 having a threaded opening 16 at one end for receiving the threaded end 18 of the tire valve stem 4. The other end of the housing receives a male adaptor that closes the housing to form a sealed unit. The male adaptor and housing are shown as having a threaded connection, but these parts may as well be cemented together for ease of manufacture. A moveable valve element 22 fits into the housing and includes a first valve seat surface 24 that cooperates with a second valve seat surface 26 on the male adaptor to prevent flow back into the hose 12 when the pressure in the tire exceeds that in the hose, in accordance with the known operation of a oneway valve. Likewise, when the pressure in the hose exceeds that in the tire, the valve element 22 is forced away from the seat 26 to allow liquid to flow through the housing. Grooves 28 are provided in the valve element 22 to facilitate flow of material around the valve element.

The upstream end of the male adaptor 20 includes a quick disconnect connector 30 for interfacing with the quick disconnect 8 of the delivery tube.

As is known in the art, the quick disconnect 8 includes a slidable, spring driven outer sleeve that fits over the connection 30. The quick disconnect is fitted with a series of perforations in the immediate vicinity of its lip. These perforations house ball bearings which are freely movable within the perforations when the sleeve is withdrawn against the spring. When the sleeve is released, the spring forces the ball bearings to protrude into the interior of the inner annulus, where they engage the lip of the male adaptor 20.

The male adaptor 20 is roughly cylindrical in shape and is fitted on one end with an annular lip 32 for cooperation with the quick disconnect 8.

The entire valve assembly 2 is designed for disposal after each use, and is therefore made of inexpensive but durable materials. Preferably, the male and female adaptor are made of a clear or opaque plastic, such as polyethylene or polyacrylate, which allows the user to observe the flow of liquid therein. The valve may be made of materials similar to those used for the male and female adaptor. However, it is preferred that the valve be made of a low friction plastic or polymer, such as Teflon or a similar polyfluoroethylene. It is also preferred that the valve material incorporate a carbon black filler or similar pigment to render it more visible when it is inside the female adaptor.

It will be appreciated that a unique method and apparatus for flatproofing tires have been described. Modifications within the scope of the appended claims will be apparent to those skilled in the art.

What is claimed is:

1. In combination, a valve assembly for use in flatproofing a tire equipped with a tire stem, and a source of flatproofing liquid reactants that will cure inside said tire to produce a cured polymeric mass, wherein said valve assembly comprises:

one-way valve means for providing a one-way flow of said flatproofing liquid reactants from an inlet to an outlet and having a housing;

connecting means consisting essentially of an opening in said housing for connecting said outlet of said valve means to said tire stem; and attaching means for removably attaching said inlet of said valve means to said source of flatproofing liquid reactants.

2. Apparatus according to claim 1 wherein said attaching means comprises receiving means for receiving a quick disconnect connector.

\* \* \* \* \*